(12) United States Patent
Losh et al.

(10) Patent No.: US 10,338,740 B2
(45) Date of Patent: Jul. 2, 2019

(54) REDUCING BACKGROUND CAPACITANCE ASSOCIATED WITH A TOUCH SURFACE

(71) Applicant: Synaptics Incorporated, San Jose, CA (US)

(72) Inventors: Jonathan Losh, San Jose, CA (US); John Weinerth, San Jose, CA (US); Derek Solven, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 230 days.

(21) Appl. No.: 15/355,308

(22) Filed: Nov. 18, 2016

(65) Prior Publication Data
US 2018/0143736 A1 May 24, 2018

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ........................................... G06F 3/041–3/047
See application file for complete search history.

(56) References Cited

U.S. PATENT DOCUMENTS

| | | | | |
|---|---|---|---|---|
| 5,374,787 A * | 12/1994 | Miller | ................... | G06F 1/1626 178/18.06 |
| 5,495,077 A * | 2/1996 | Miller | ................... | G06F 1/1626 178/18.06 |
| 5,543,588 A * | 8/1996 | Bisset | ................... | G06F 1/1626 178/18.06 |
| 8,599,167 B2 * | 12/2013 | Joharapurkar | ........ | G06F 3/0418 178/18.01 |
| 8,624,870 B2 * | 1/2014 | Joharapurkar | ........ | G06F 3/0416 178/18.01 |
| 8,830,207 B1 * | 9/2014 | Joharapurkar | ........ | G06F 3/0418 178/18.01 |
| 9,250,740 B2 * | 2/2016 | Akai | ..................... | G06F 3/0418 |
| 9,658,722 B2 * | 5/2017 | Schwartz | .............. | G06F 3/0418 |
| 9,965,081 B2 * | 5/2018 | Park | ..................... | G06F 3/0416 |
| 2011/0261006 A1 * | 10/2011 | Joharapurkar | ........ | G06F 3/0416 345/174 |
| 2014/0092061 A1 * | 4/2014 | Akai | ..................... | G06F 3/0418 345/174 |

(Continued)

*Primary Examiner* — Gene W Lee
(74) *Attorney, Agent, or Firm* — Ferguson Braswell Fraser Kubasta PC

(57) ABSTRACT

A processing system for reducing background capacitance associated with a touch surface. The processing system includes: transmitter circuitry that drives a transmitter electrode of the touch surface with a waveform; receiver circuitry that detects input in a sensing region of the touch surface based on a resulting signal from a receiver electrode of the touch surface; and offset reduction circuitry connected to the receiver circuitry that: subtracts, prior to completion of an integration period of the waveform, a first plurality of charge associated with background capacitance from the resulting signal using a capacitor; executes a first reload of the capacitor prior to completion of the integration period of the waveform; and subtracts, prior to completion of the integration period of the waveform, a second plurality of charge associated with background capacitance from the resulting signal using the capacitor after the first reload.

20 Claims, 10 Drawing Sheets

(56) References Cited

U.S. PATENT DOCUMENTS

2017/0315650 A1* 11/2017 Reynolds .............. G06F 3/0414
2017/0315662 A1* 11/2017 Reynolds .............. G06F 3/0414
2017/0344144 A1* 11/2017 Pedersen ............... G06F 3/0418

* cited by examiner

State (1)

State (2)

State (3)

State (4)

State (5)

State (6)

State (7)

State (8)

State (9)

State (10)

State (11) is back to State (3)

STATE (2)

STATE (1)

STATE (4)

STATE (3)

US 10,338,740 B2

REDUCING BACKGROUND CAPACITANCE ASSOCIATED WITH A TOUCH SURFACE

TECHNICAL FIELD

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). Proximity sensor devices may be used to detect finger, styli, or pens.

SUMMARY

In general, in one aspect, embodiments of the invention relate to a processing system for reducing background capacitance associated with a touch surface. The processing system comprises: transmitter circuitry configured to drive a transmitter electrode of the touch surface with a waveform; receiver circuitry configured to detect input in a sensing region of the touch surface based on a resulting signal from a receiver electrode of the touch surface; and offset reduction circuitry connected to the receiver circuitry and configured to: subtract, prior to completion of an integration period of the waveform, a first plurality of charge associated with background capacitance from the resulting signal using a capacitor; execute a first reload of the capacitor prior to completion of the integration period of the waveform; and subtract, prior to completion of the integration period of the waveform, a second plurality of charge associated with background capacitance from the resulting signal using the capacitor after the first reload.

In general, in one aspect, embodiments of the invention relate to a method for reducing background capacitance associated with a touch surface. The method comprises: driving a transmitter electrode of the touch surface with a waveform; integrating, by receiver circuitry, a resulting signal from a receiver electrode of the touch surface; subtracting, prior to completion of an integration period of the waveform, a first plurality of charge associated with background capacitance from the resulting signal using a capacitor; executing a first reload of the capacitor prior to completion of the integration period of the waveform; subtracting, prior to completion of the integration period of the waveform, a second plurality of charge associated with background capacitance from the resulting signal using the capacitor after the first reload; and detecting input in a sensing region of the touch surface based on the resulting signal.

Other aspects of the embodiments will be apparent from the following description and the appended claims.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that may facilitate improved usability along with various other benefits.

Figure 1:
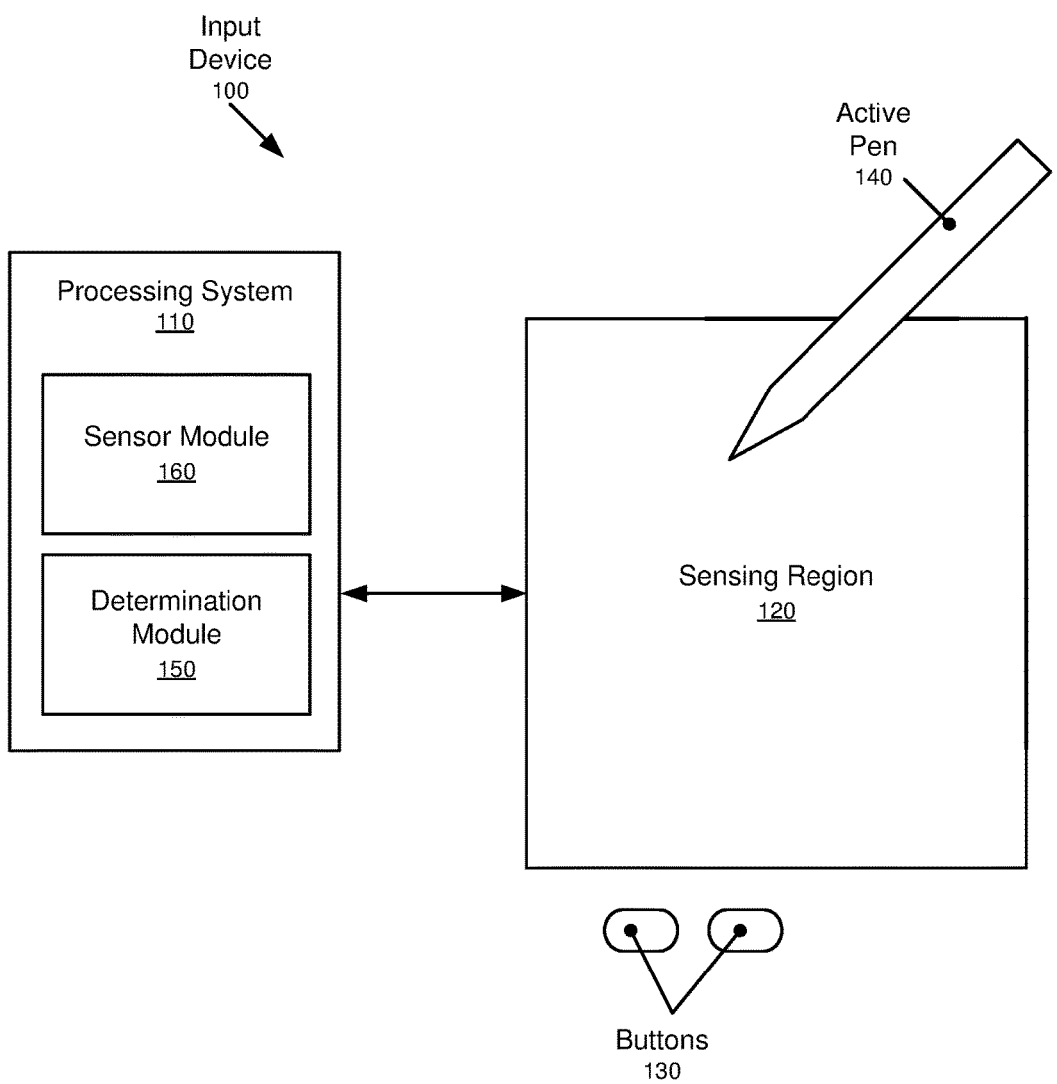
FIG. 1 and FIG. 2 show block diagrams of an input device in accordance with one or more embodiments.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module (150) may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects in a sensing region (120). Example input objects include styli, an active pen (140), and fingers. Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (e.g., active pen (140), one or more fingers, etc.)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows a determination module (150) and a sensor module (160), alternative or additional modules may exist in accordance with one or more embodiments. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system (110).

It should be understood that while many embodiments are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Although FIG. 1 only shows a single instance of transmitter circuitry (210), a single instance of receiver circuitry (220), and a single instance of offset reduction circuitry (230), those skilled in the art, having the benefit of this detailed description, will appreciate that a single input device (200) may have multiple instances of transmitter circuitry (210), receiver circuitry (220), and offset reduction circuitry (230). For example, each transmitter/receiver electrode pair may have an instance of the transmitter circuitry (210), the receiver circuitry (220), and the offset reduction circuitry (230).

While FIG. 1 shows a configuration of components, other configurations may be used without departing from the scope of the invention. For example, various components may be combined to create a single component. As another example, the functionality performed by a single component may be performed by two or more components.

Figure 2:
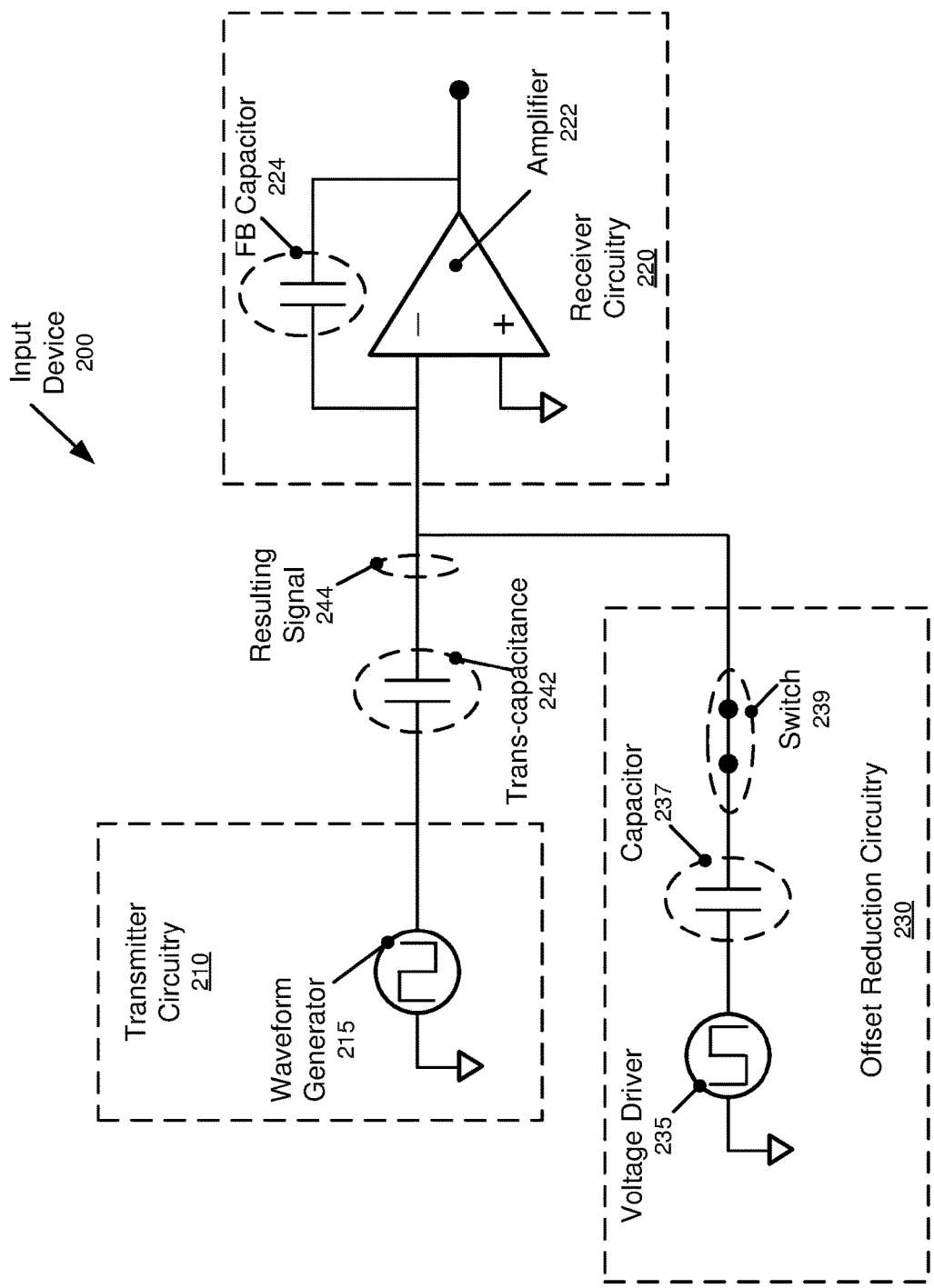

FIG. 2 shows an input device (200) in accordance with one or more embodiments. As shown in FIG. 2, the input device (200) includes transmitter circuitry (210), receiver circuitry (220), and offset reduction circuitry (230). One or more of the transmitter circuitry (210), receiver circuitry (220), and offset reduction circuitry (230) may be located in the sensor module (160), discussed above in reference to FIG. 1. One or more of the transmitter circuitry (210), receiver circuitry (220), and offset reduction circuitry (230) may be located in the determination module (150), discussed above in reference to FIG. 1.

As discussed above, the input device (200) may implement capacitive sensing by measuring changes in the capacitive coupling (i.e., trans-capacitance (242)) between the sensor electrodes of a touch surface (not shown). As also discussed above, the presence of an input object affects/changes the trans-capacitance (242) between the sensor electrodes. The transmitter circuitry (210) is configured to drive at least one sensor electrode (e.g., transmitter electrode) with a waveform. Another sensor electrode (e.g. receiver electrode) receives a resulting signal (244) that is a function of the waveform and the trans-capacitance (242). The resulting signal (244) may also include undesirable background capacitance, which offsets the capacitance measurements.

In one or more embodiments, the transmitter circuitry (210) includes a waveform generator (215) to generate the waveform. The waveform may be a square waveform. The peak of the waveform may be 9V, 5V, 2.5V, etc. Other peak voltages and other types of waveforms (e.g., sine waves) are also possible. In one or more embodiments, the receiver circuitry (220) includes an integrator composed of an amplifier (222) and a feedback (FB) capacitor (224). The resulting signal (244) is an input to the inverting (i.e., negative) terminal of the amplifier (222). The integrator integrates the charge in the resulting signal (224), and this integration result is used to detect the presence of an input object. The integration period may be a half-cycle of the waveform generated by the waveform generator (215). The transmitter circuitry (210) and the receiver circuitry (220) may have additional circuit components not shown in FIG. 2. For example, the receiver circuitry (220) may include a switch in parallel with the FB capacitor (224) to short the FB capacitor (224) just prior to each integration period.

In one or more embodiments, the input device (200) includes the offset reduction circuitry (230). The offset reduction circuitry (230) is configured to reduce the background capacitance in the resulting signal (244). In other words, the offset reduction circuitry (230) is configured to reduce, or even eliminate, the offset in the capacitive measurements caused by the background capacitance. Specifically, prior to completion of a single integration period (e.g., during the integration period, before the current integration period but after the previous integration period, etc.), the offset reduction circuitry (230) may repeatedly subtract charge from the resulting signal (244) to reduce the offset caused by the background capacitance.

As shown in FIG. 2, the offset reduction circuitry (230) includes a voltage driver (235), a capacitor (237), and at least one switch (239). The offset reduction circuitry (210) may have additional circuit components not shown in FIG. 2. In one or more embodiments of the invention, the voltage driver (235) generates an output that is similar to the waveform generated by the waveform generator (215), but opposite in polarity. Moreover, this output is used to drive the capacitor (237) such that charge is subtracted from the resulting signal (244). Prior to completion of the integration period (e.g., during the integration period, before the current integration period but after the previous integration period, etc.), once the charge subtracted by the capacitor (237) has stopped flowing, the switch (239) is opened to disconnect the capacitor (237) from the receiver circuitry (220). Then, prior to completion of the integration period, the capacitor is reloaded to its original state. The switch (239) is closed such that the capacitor may again subtract additional charge from the resulting signal (244) during the same integration period. This process may be repeated multiple times prior to completion of the integration period.

Figure 3:
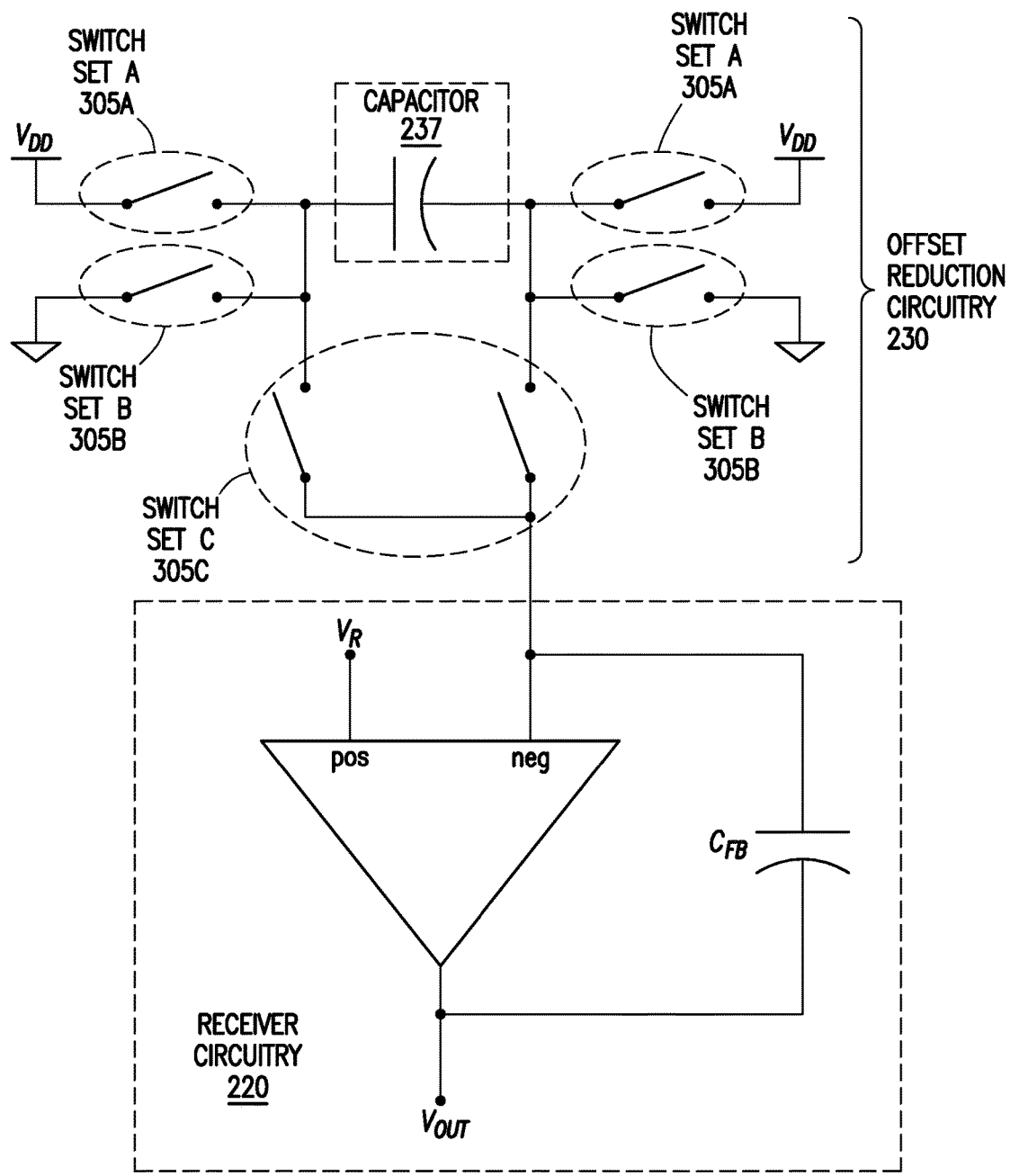
FIG. 3 shows a block diagram of offset reduction circuitry in accordance with one or more embodiments.

FIG. 3 shows an example implementation of the offset reduction circuitry (230) in accordance with one or more embodiments. As shown in FIG. 3, the offset reduction circuitry (230) includes the voltage driver ($V_{DD}$), the capacitor (237), and multiple sets of switches: Switch Set A (305A), Switch Set B (305B), and Switch Set C (305C). In one or more embodiments, switch set A (305A) can connect (or disconnect) one or both terminals of capacitor (237) to the voltage driver ($V_{DD}$). In one or more embodiments, switch set B (305B) can connect (or disconnect) one or both terminals of capacitor (237) to ground. In one or more embodiments, switch set C (305C) can connect (or disconnect) one or both terminals of capacitor (237) to the receiver circuitry (220). $C_{FB}$ is the FB capacitor (224) discussed above in reference to FIG. 2. The reference voltage ($V_R$) is an input to the non-inverting (i.e., positive) terminal of the amplifier of the receiver circuitry (220).

Figure 4A:
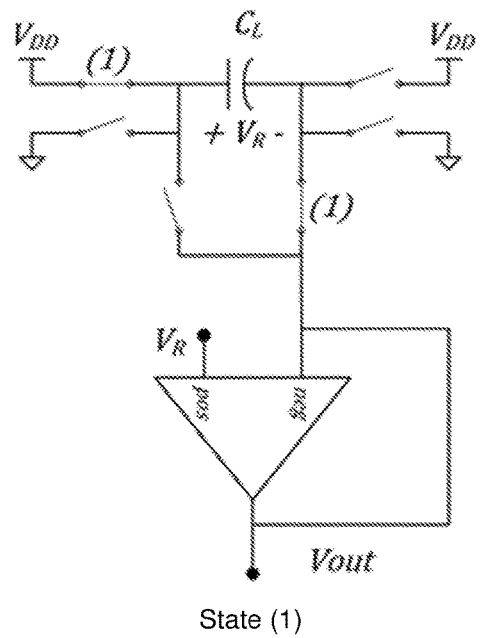
FIGS. 4A-4C show an example in accordance with one or more embodiments.
Figure 4A:
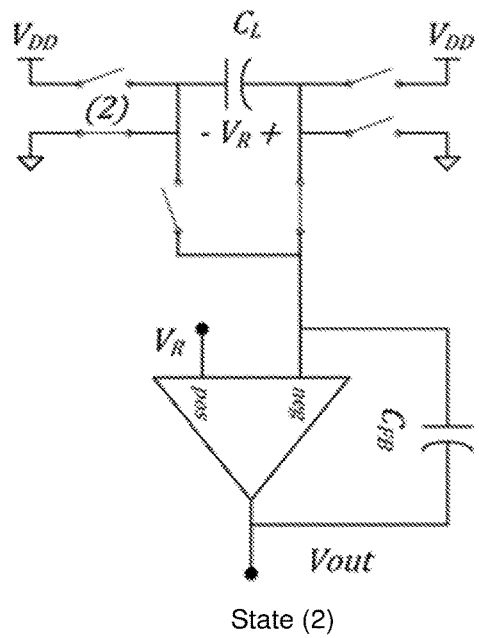
Figure 4A:
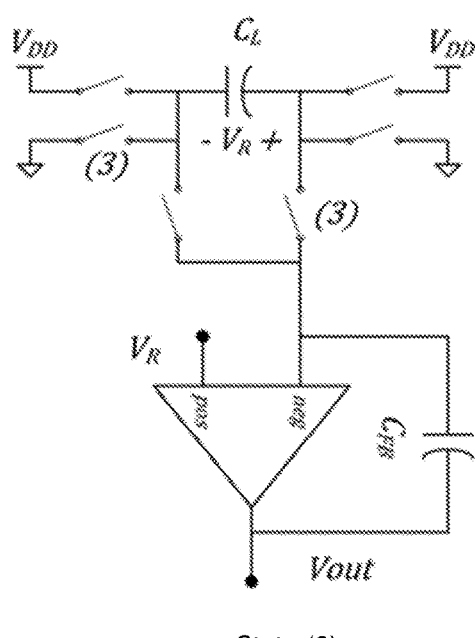
Figure 4A:
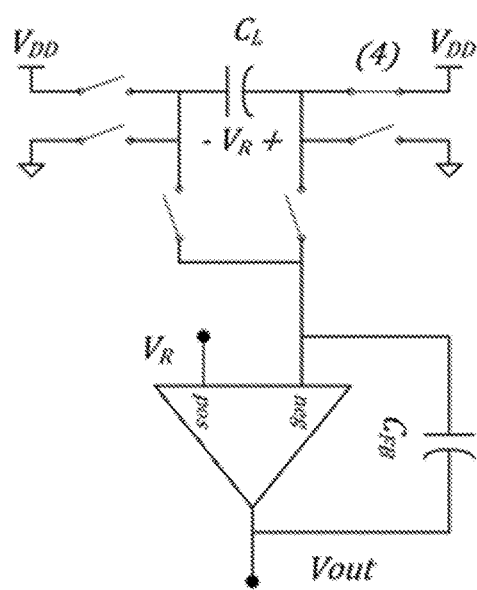
Figure 4B:
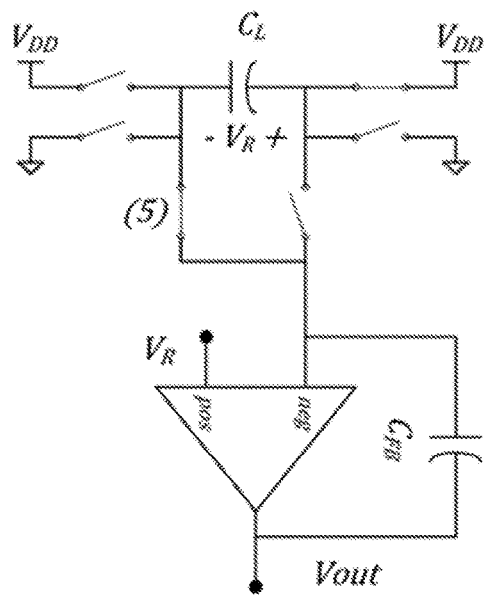
Figure 4B:
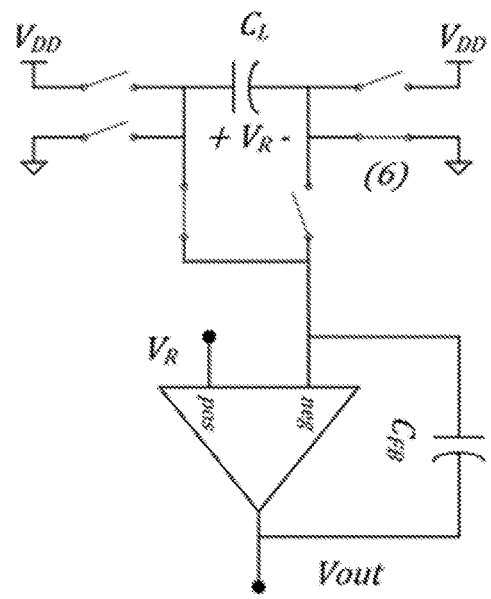
Figure 4B:
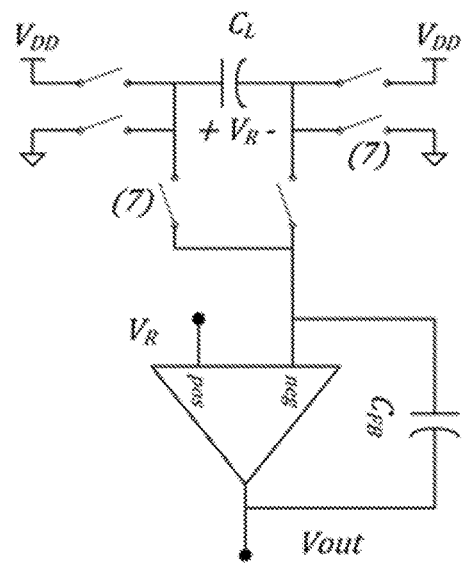
Figure 4B:
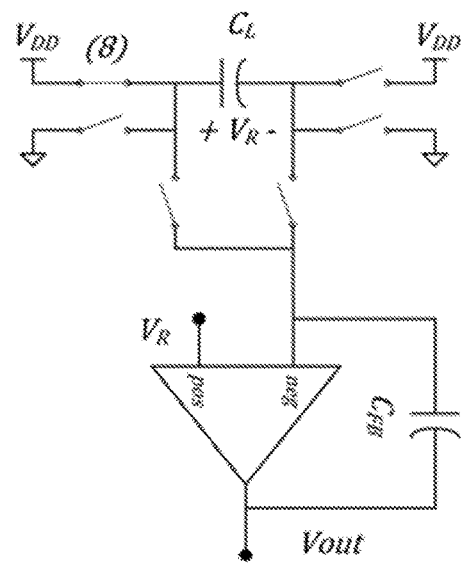
Figure 4C:
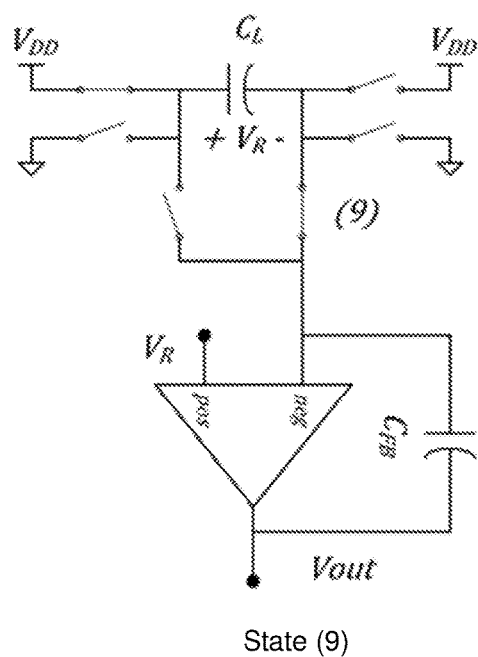
Figure 4C:
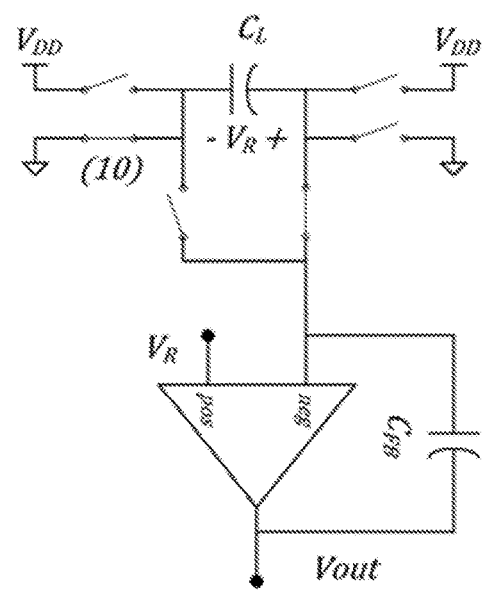

FIG. 4A, FIG. 4B, and FIG. 4C show an example in accordance with one or more embodiments. Specifically, FIG. 4A, FIG. 4B, and FIG. 4C show the operation of the offset reduction circuitry (230), discussed above in reference to FIG. 3. The capacitor (237) is denoted by $C_L$ in FIG. 4A, FIG. 4B, and FIG. 4C. State (1) of FIG. 4A is the starting state. In State (1), $C_L$ is effectively charged by connecting one terminal of $C_L$ to $V_{DD}$ using switch set A (305A). Further, the other terminal of $C_L$ is connected to the receiver circuitry (220) using switch set C (305C). As shown, $C_{FB}$ of the receiver circuitry (220) is shorted during state (1).

State (2) in FIG. 4A shows the start of the integration period. $C_L$ is disconnected from $V_{DD}$, but the terminal previously connected to $V_{DD}$ is connected to ground using switch set B (305B). With the configuration shown in State (2), charge is subtracted from the resulting signal (244). Those skilled in the art, having the benefit of this detailed description, will appreciate that the subtracted charge ($Q_L$) can be approximated as $2 \times V_R \times C_L$.

In State (3) of FIG. 4A, after the charge being subtracted by $C_L$ stops flowing, the terminals of $C_L$ are disconnected from $V_{DD}$, from ground, and from the receiver circuitry (220) using the switch sets (305A, 305B, 305C). Then, as shown in State (4) of FIG. 4A, $C_L$'s connections are flipped as part of a reload operation. Specifically, a different terminal of $C_L$ (i.e., different terminal with respect to State (1)) is connected to $V_{DD}$. State (5) of FIG. 4B is also part of the reload operation. In State (5) of FIG. 4B, a different terminal of $C_L$ (i.e., different terminal with respect to State (1)) is connected to the receiver circuitry (220). This effectively reloads $C_L$ to the pre-firing levels.

In State (6), $C_L$ is disconnected from $V_{DD}$, but the terminal previously connected to $V_{DD}$ is connected to ground using switch set B (305B). With the configuration shown in State (6), charge is subtracted from the resulting signal (244). Both State (2) and State (6) occur during the same integration period.

In State (7) of FIG. 4B, after the charge being subtracted by $C_L$ stops flowing, the terminals of $C_L$ are disconnected from $V_{DD}$, from ground, and from the receiver circuitry (220) using the switch sets (305A, 305B, 305C).

Then, as shown in State (8) of FIG. 4B, $C_L$'s connections are flipped as part of another (i.e. different) reload operation. Specifically, a different terminal of $C_L$ (i.e., different terminal with respect to State (5)) is connected to $V_{DD}$ using switch set A (305A). State (9) in FIG. 4C is also part of the reload operation. In State (9) of FIG. 4C, a different terminal of $C_L$ (i.e., different terminal with respect to State (5)) is connected to the receiver circuitry (220) using switch set C (305C). This effectively once again reloads $C_L$ to the pre-firing levels.

In State (10) of FIG. 4C, $C_L$ is disconnected from $V_{DD}$, but the terminal previously connected to $V_{DD}$ is connected to ground using switch set B (305B). With the configuration shown in State (10), charge is subtracted from the resulting signal (244). Both State (2), State (6), and State (10) occur during the same integration period.

State (11) (not shown) is the same as State (3) in FIG. 4A. The process may repeat multiple time during a single integration period. By using multiple reloads, more charge can be subtracted from the resulting signal using the same circuit and without increasing $V_{DD}$ or $C_L$.

Figure 5:
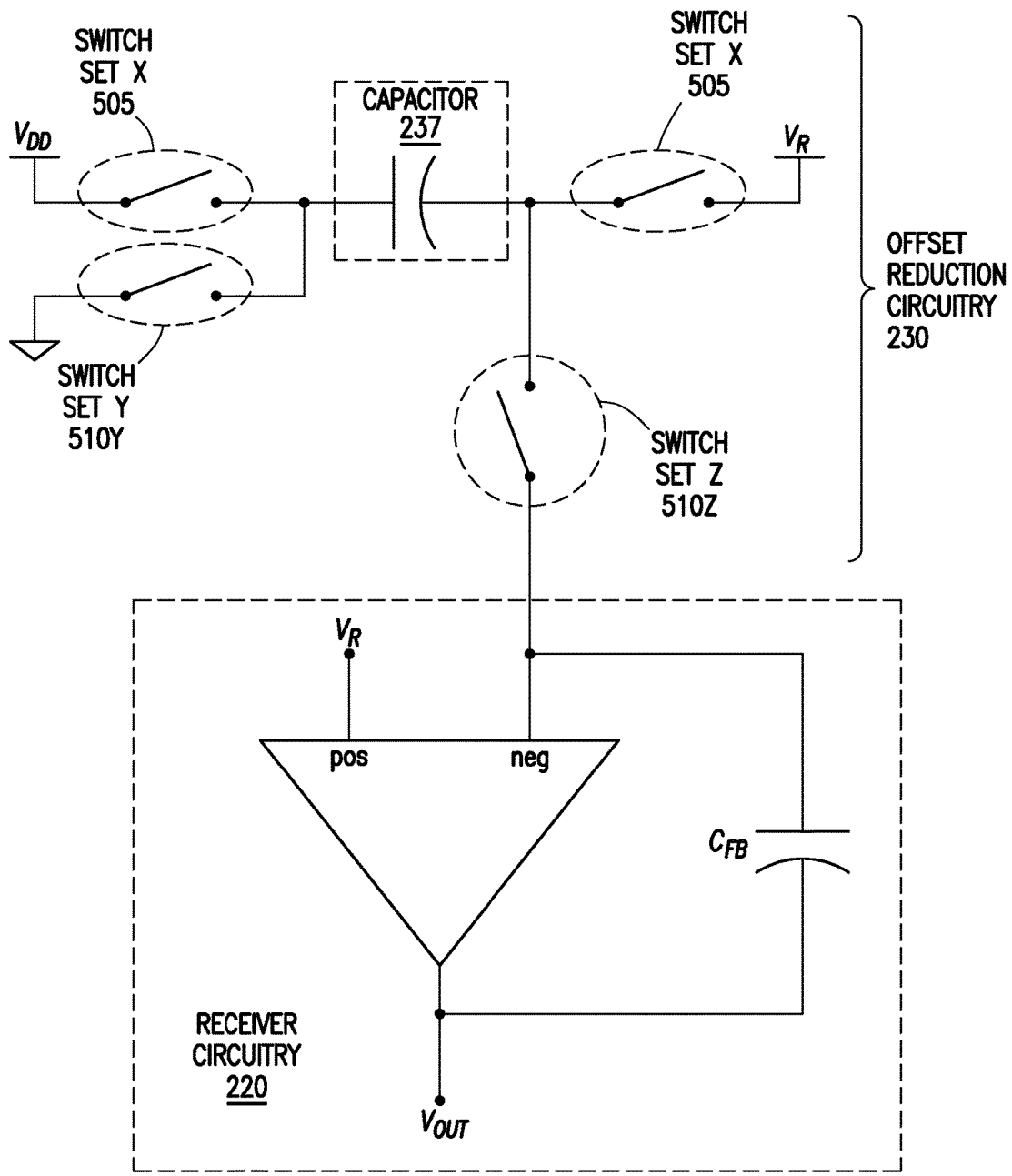
FIG. 5 shows a block diagram of offset reduction circuitry in accordance with one or more embodiments.

FIG. 5 shows an example implementation of the offset reduction circuitry (230) in accordance with one or more embodiments. As shown in FIG. 5, the offset reduction circuitry (230) includes the voltage driver ($V_{DD}$), a reference voltage ($V_R$), the capacitor (237), switch set X (505), switch Y (510Y), and switch Z (510Z). In one or more embodiments, switch set X (505) can connect one terminal of capacitor (237) to the voltage driver ($V_{DD}$) and the other terminal of capacitor (237) to the reference voltage $V_R$. In one or more embodiments, switch Y (510Y) can connect one terminal of capacitor (237) to ground. In one or more embodiments, switch Z (510Z) can connect (or disconnect) the other terminal of capacitor (237) to the receiver circuitry (220). The reference voltage ($V_R$) is an input to the non-inverting terminal of the amplifier.

Figure 6B:
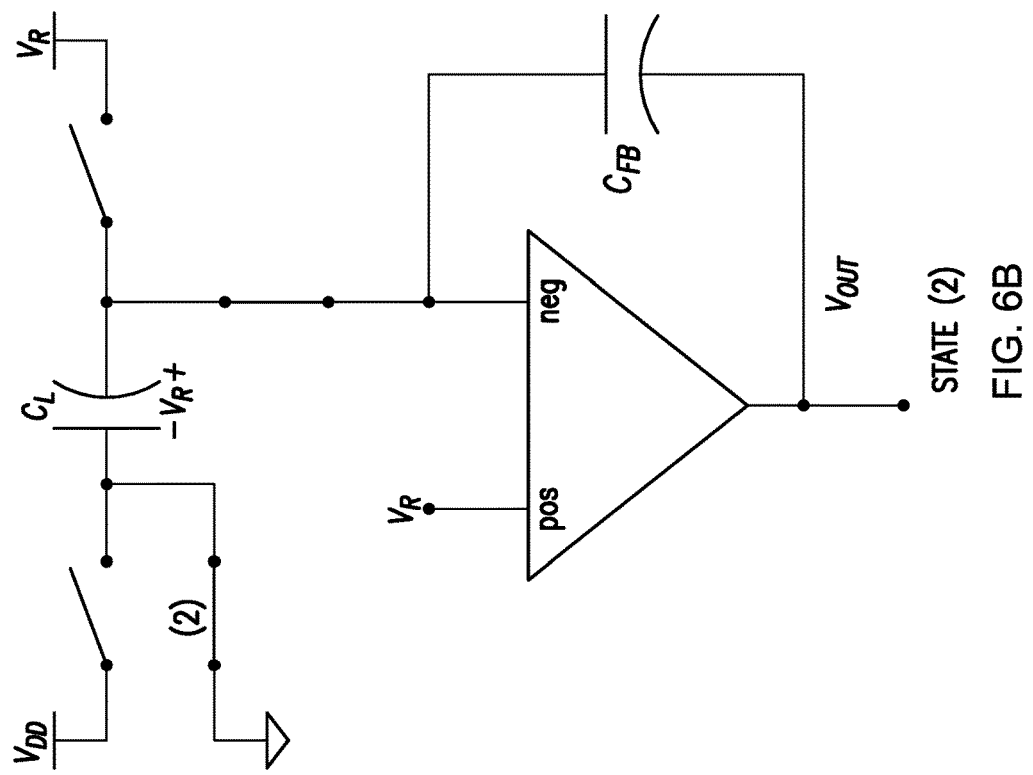
FIGS. 6A-6D show an example in accordance with one or more embodiments.
Figure 6A:
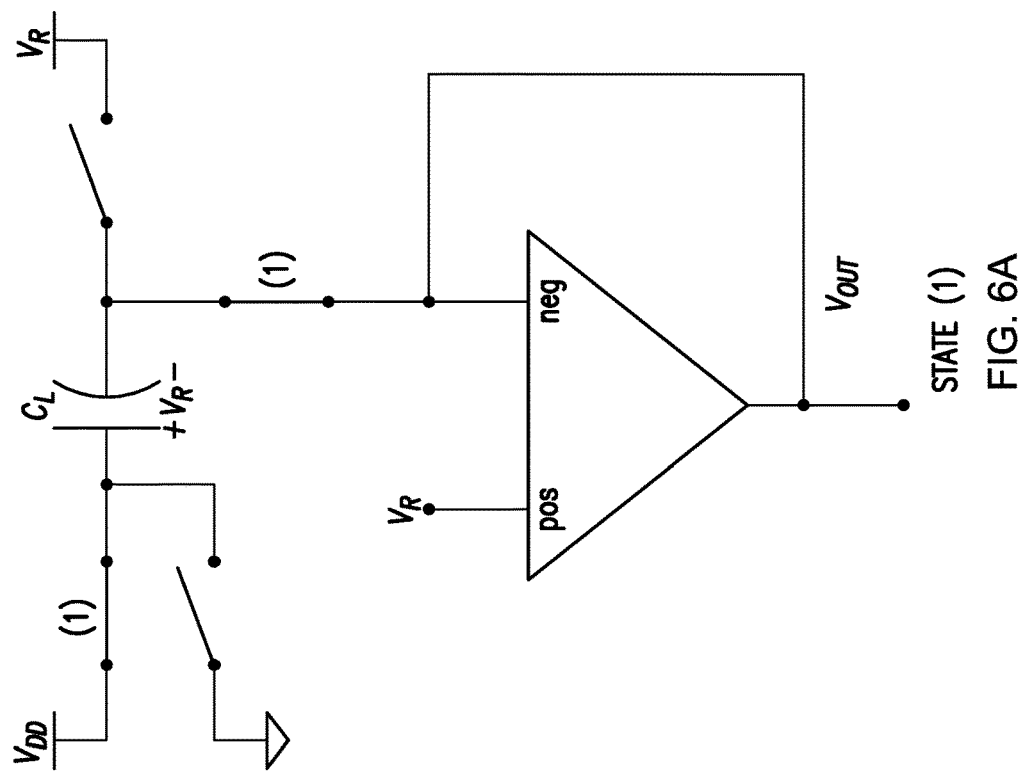

FIGS. 6A-6D show an example in accordance with one or more embodiments. Specifically, FIGS. 6A-6D show the operation of the offset reduction circuitry (230), discussed above in reference to FIG. 5. The capacitor (237) is denoted by $C_L$ in FIGS. 6A-6D. State (1) of FIG. 6A is the starting state. In State (1) of FIG. 6A, $C_L$ is effectively charged by connecting one terminal of $C_L$ to $V_{DD}$ using switch set X (505). Further, the other terminal of $C_L$ is connected to the receiver circuitry (220) using switch Z (510Z). As shown, $C_{FB}$ of the receiver circuitry (220) is shorted during state (1).

In State (2) of FIG. 6B, $C_L$ is disconnected from $V_{DD}$, but the terminal previously connected to $V_{DD}$ is connected to ground using switch Y (505Y). With the configuration shown in State (2), charge is subtracted from the resulting signal (244). Those skilled in the art, having the benefit of this detailed description, will appreciate that the subtracted charge ($Q_L$) can be approximated as $2 \times V_R \times C_L$.

Figure 6D:
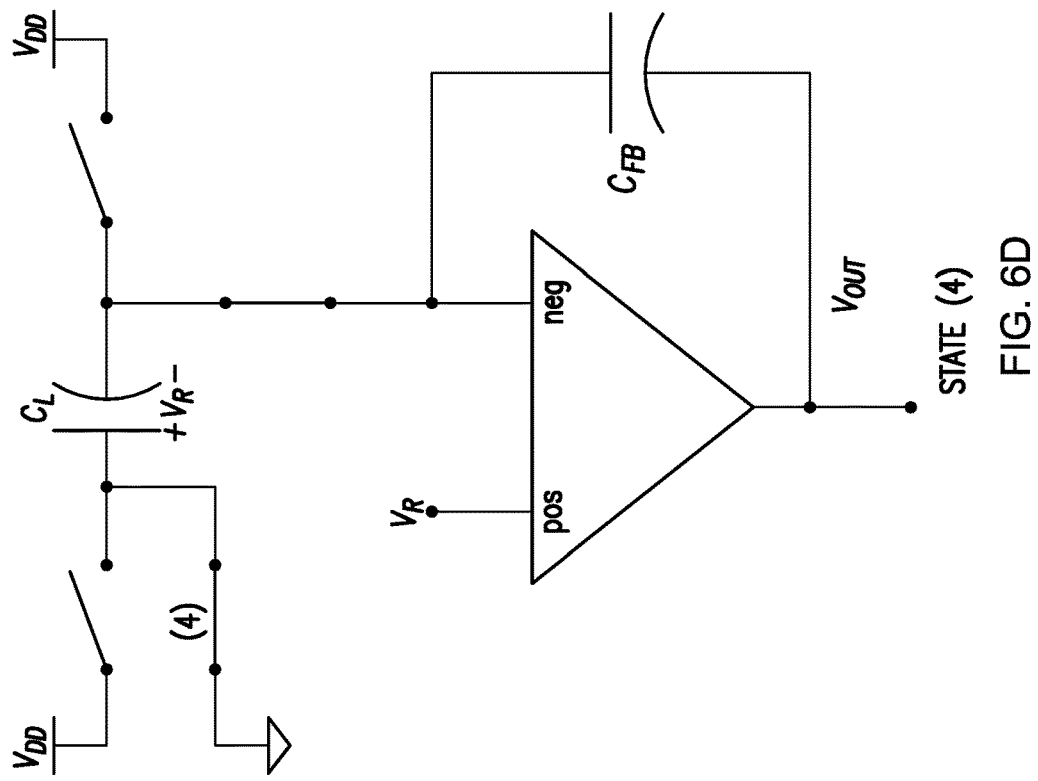
Figure 6C:
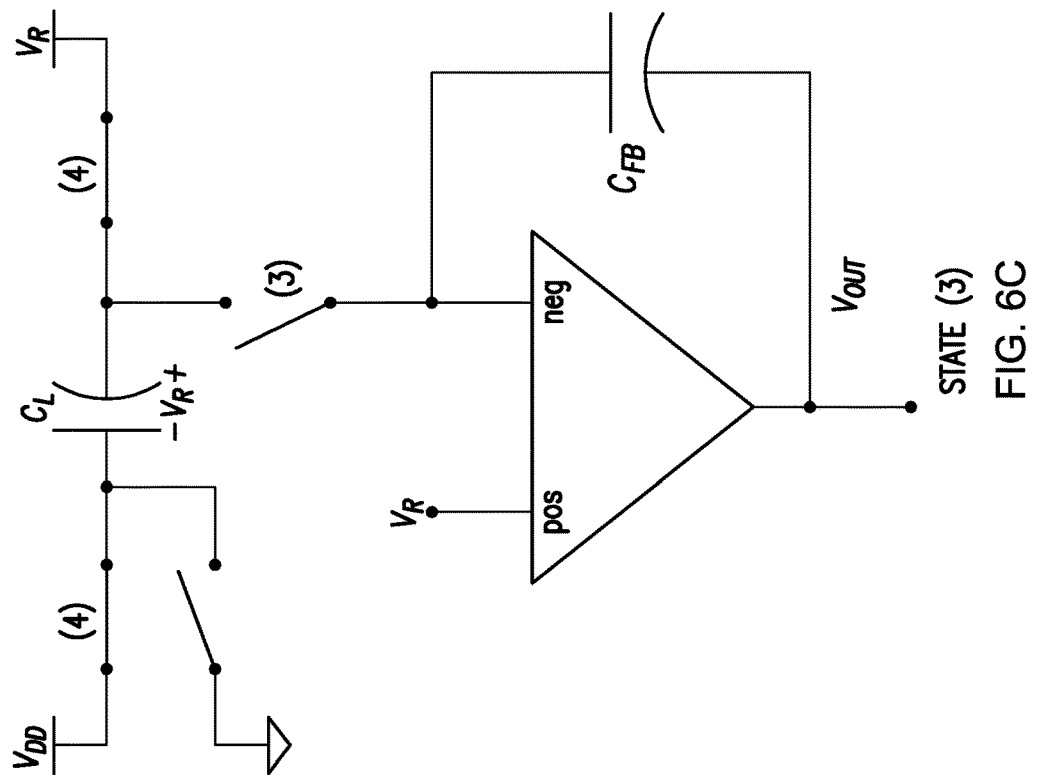

In State (3) of FIG. 6C, after the charge being subtracted by $C_L$ stops flowing, one terminal of $C_L$ is connected to $V_{DD}$, while the other terminal of $C_L$ is connected to $V_R$ using switch set X (505). Further, $C_L$ is disconnected from ground and from the receiver circuitry (220) using switch Y (510Y) and switch Z (510Z), respectively. This effectively reloads $C_L$ to the pre-firing levels. The charge subtraction process (i.e., State (2) in FIG. 6B) and subsequent reload may be repeated multiple times during a single integration period. For example, State (4) in FIG. 6D is a repeat of State (2) in FIG. 6B. By using multiple reloads during a single integration period, more charge can be subtracted from the resulting signal using the same circuit and without increasing $V_{DD}$ or $C_L$.

Figure 7:
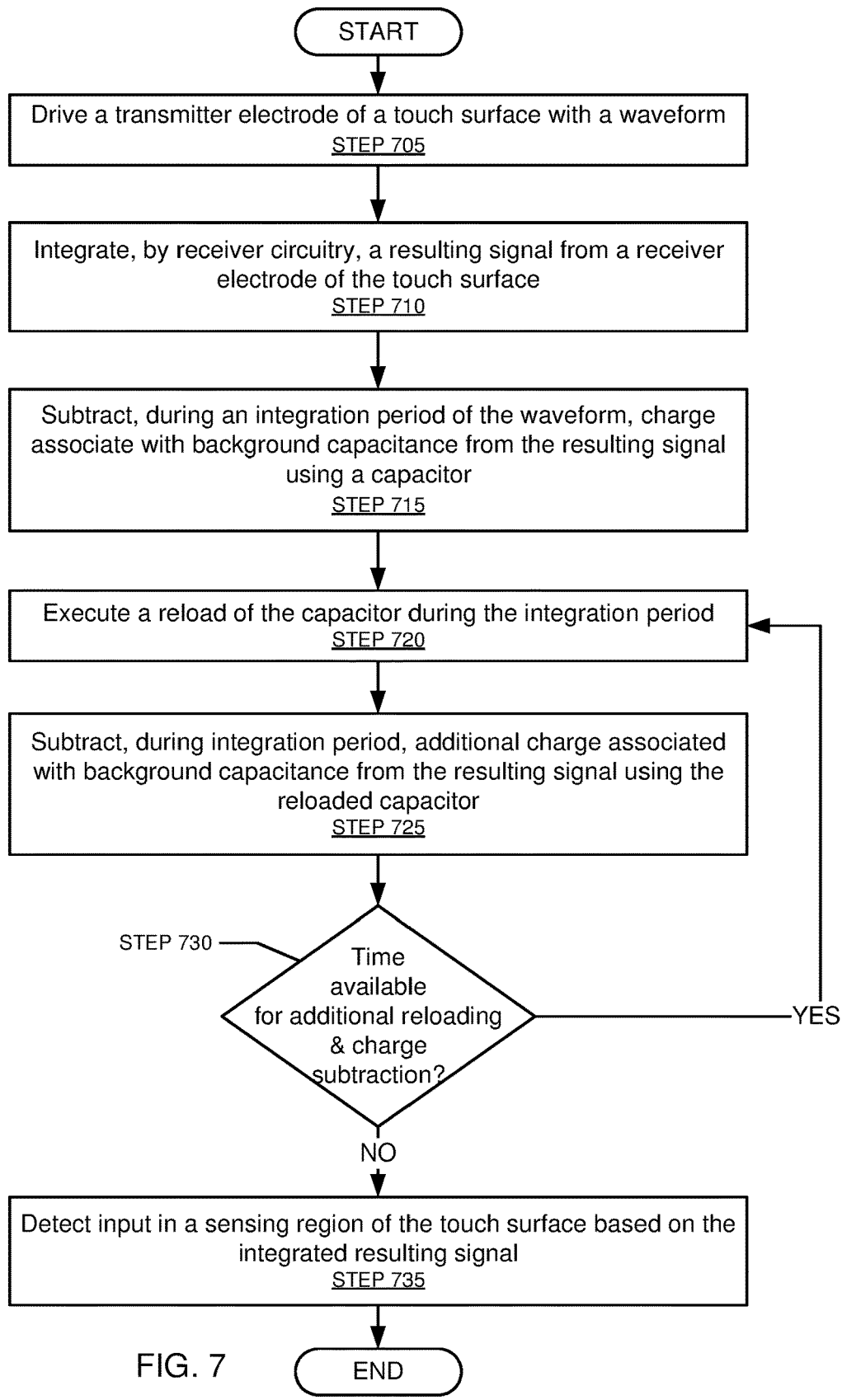
FIG. 7 shows a flowchart in accordance with one or more embodiments.

FIG. 7 shows a flowchart in accordance with one or more embodiments. The flowchart of FIG. 7 depicts a method for reducing noise in an input device like input device (100) and/or input device (200). One or more of the steps in FIG. 7 may be performed by the components of the input system (200) or input system (100), discussed above in reference to FIG. 2 and FIG. 1, respectively. In one or more embodiments, one or more of the steps shown in FIG. 7 may be omitted, repeated, and/or performed in a different order than the order shown in FIG. 7. Accordingly, the scope of the invention should not be considered limited to the specific arrangement of steps shown in FIG. 7.

Initially, a transmitter electrode of a touch surface is driven with a waveform (STEP 705). The waveform may be a square waveform. Further, the waveform may have a peak voltage of 9V or less. The touch surface may be a touchscreen or a touchpad that performs capacitive sensing based on changes in trans-capacitance measurements between sensor electrodes.

In STEP 710, a resulting signal from a receiver electrode is integrated by receiver circuitry. The resulting signal is a function of the waveform and the capacitive coupling between the transmitter and receiver electrode. As discussed above, user input (e.g., one or more fingers, active pens, etc.) affects/changes the capacitive coupling between the transmitter and receiver electrode. The resulting signal may also include undesirable background capacitance, which offsets the capacitance measurements. The integration may be performed by a charge integrator having an amplifier and a feedback capacitor. The integration period may be one-half of the waveform cycle.

In STEP 715, charge is subtracted from the resulting signal to reduce the offset caused by the background capacitance. Charge may be subtracted by offset reduction circuitry comprising a capacitor that is connected to the receiver circuitry and connected to a voltage driver having an output that is similar to the waveform, but opposite in polarity. The charge is subtracted during the same integration period.

In STEP 720, the capacitor of the offset reduction circuitry is reloaded. The reloading may be executed by flipping the connections between the terminals of the capacitor and the voltage driver, as discussed above in reference to FIG. 4A-FIG. 4C. Additionally or alternatively, the reloading may be executed by attaching one terminal of the capacitor to the voltage divider and the other connection to a reference voltage, as discussed above in reference to FIGS. 6A-6D. This reloading step is executed during the same integration period.

In STEP 725, additional charge is subtracted from the resulting signal using the reloaded capacitor. This subtraction also takes place during the same integration period.

In STEP 730, it is determined whether enough time exists during the integration period to reload the capacitor and subtract more charge in order to reduce the offset of the background capacitance. When it is determined that sufficient time exists, the process returns to STEP 720. When it is determined that insufficient time exists, the process proceeds to STEP 735.

In STEP 735, an input (e.g., one or more fingers, active pen, etc.) is detected in the sensing region of the touchpad based on the integrated resulting signal. As the offset caused by the background capacitance has been reduced, or even eliminated, the determination regarding the input object in the sensing region is more reliable.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for reducing background capacitance associated with a touch surface, comprising:
   transmitter circuitry configured to drive a transmitter electrode of the touch surface with a waveform, wherein the waveform is periodic;
   receiver circuitry configured to detect input in a sensing region of the touch surface based on a resulting signal from a receiver electrode of the touch surface; and
   offset reduction circuitry connected to the receiver circuitry and configured to:
      subtract, prior to completion of an integration period of the waveform, a first plurality of charge associated with background capacitance from the resulting signal using a capacitor,
      wherein the integration period is approximately 1/N of a cycle of the waveform driving the transmitter electrode,
      wherein N is a natural number, and
      wherein the resulting signal is integrated by the receiver circuitry during the integration period;
      execute a first reload of the capacitor prior to completion of the integration period of the waveform; and
      subtract, prior to completion of the integration period of the waveform, a second plurality of charge associated with background capacitance from the resulting signal using the capacitor after the first reload.

2. The processing system of claim 1, wherein the waveform has a peak of 9V, wherein the first reload is executed during the integration period, and wherein the second plurality of charge is subtracted during the integration period.

3. The processing system of claim 1, wherein:
the waveform is a square wave;
the offset reduction circuitry comprises a voltage driver coupled to the capacitor;
the voltage driver comprises an output with a polarity that is opposite to the square wave; and
the integration period is a half-cycle of the square wave.

4. The processing system of claim 1, wherein the receiver circuitry comprises a charge integrator comprising an amplifier, and wherein the receiver electrode and the capacitor are coupled to an inverting terminal of the amplifier.

5. The processing system of claim 4, wherein the offset reduction circuitry comprises a first switch that disconnects the capacitor from the receiver circuitry during the first reload.

6. The processing system of claim 5, wherein the offset reduction circuitry further comprises:
a set of switches that connect, during the first reload, a first terminal of the capacitor to a voltage driver and a second terminal of the capacitor to a reference voltage, wherein the reference voltage is an input to a non-inverting terminal of the amplifier.

7. The processing system of claim 6, wherein the offset reduction circuitry further comprises:
a second switch that connects the first terminal of the capacitor to ground to subtract the first plurality of charge.

8. The processing system of claim 1, wherein the offset reduction circuitry comprises a first set of switches that disconnect the capacitor from the receiver circuitry during the first reload of the capacitor.

9. The processing system of claim 8, wherein the offset reduction circuitry further comprises a second set of switches configured to:
connect a first terminal of the capacitor but not a second terminal of the capacitor to a voltage driver for the first reload; and
connect the second terminal but not the first terminal to the voltage driver for a second reload of the capacitor prior to completion of the integration period.

10. The processing system of claim 9, wherein the offset reduction circuitry further comprises a third set of switches configured to:
connect the first terminal but not the second terminal to ground to subtract the second plurality of charge; and
connect the second terminal but not the first terminal to ground to subtract the first plurality of charge.

11. A method for reducing background capacitance associated with a touch surface, comprising:
driving a transmitter electrode of the touch surface with a waveform, wherein the waveform is periodic;
integrating, by receiver circuitry, a resulting signal from a receiver electrode of the touch surface;
subtracting, prior to completion of an integration period of the waveform, a first plurality of charge associated with background capacitance from the resulting signal using a capacitor,
wherein the integration period is approximately 1/N of a cycle of the waveform driving the transmitter electrode, and
wherein N is a natural number;
executing a first reload of the capacitor prior to completion of the integration period of the waveform;
subtracting, prior to completion of the integration period of the waveform, a second plurality of charge associated with background capacitance from the resulting signal using the capacitor after the first reload; and
detecting input in a sensing region of the touch surface based on the resulting signal.

12. The method of claim 11, wherein the waveform has a peak of 9V, wherein the first reload is executed during the integration period, and wherein the second plurality of charge is subtracted during the integration period.

13. The method of claim 11, wherein:
the waveform is a square wave;
the capacitor is coupled to a voltage driver;
the voltage driver comprises an output with a polarity that is opposite to the square wave; and
the integration period is a half-cycle of the square wave.

14. The method of claim 11, wherein the receiver circuitry comprises a charge integrator comprising an amplifier, and wherein the sensing electrode and the capacitor are coupled to an inverting terminal of the amplifier.

15. The method of claim 14, wherein executing the first reload comprises disconnecting, using a first switch, the capacitor from the receiver circuitry.

16. The method of claim 15, wherein executing the first reload further comprises:
connecting, using a set of switches, a first terminal of the capacitor to a voltage driver and a second terminal of the capacitor to a reference voltage,
wherein the reference voltage is an input to a non-inverting terminal of the amplifier.

17. The method of claim 16, wherein subtracting the first plurality of charge comprises:
closing a second switch that connects the first terminal of the capacitor to ground.

18. The method of claim 11, wherein executing the first reload comprises:
disconnecting the capacitor from the receiver circuitry by opening a first set of switches that couple the capacitor to the receiver circuitry.

19. The method of claim 18, further comprising:
executing a second reload of the capacitor prior to completion of the integration period,
wherein executing the first reload further comprises connecting, using a second set of switches, a first terminal of the capacitor but not a second terminal of the capacitor to a voltage driver, and
wherein executing the second reload comprises connecting, using the second set of switches, the second terminal but not the first terminal to the voltage driver.

20. The method of claim 19, wherein:
subtracting the second plurality of charge comprises connecting, using a third set of switches, the first terminal but not the second terminal to ground; and
subtracting the first plurality of charge comprises connecting, using the third set of switches, the second terminal but not the first terminal to ground.

* * * * *